United States Patent
Russo et al.

(10) Patent No.: US 11,030,703 B2
(45) Date of Patent: *Jun. 8, 2021

(54) SYSTEM AND METHOD FOR MOBILE DEVICE DISABLING AND VERIFICATION

(71) Applicant: Hartford Fire Insurance Company, Hartford, CT (US)

(72) Inventors: James A. Russo, Thomaston, CT (US); Kelly J. McLaughlin, Cobalt, CT (US); Lawrence J. Opena, Cromwell, CT (US); Cindy S. DeLeón, Ansonia, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,871

(22) Filed: Aug. 26, 2019

(65) Prior Publication Data
US 2019/0378217 A1    Dec. 12, 2019

Related U.S. Application Data

(63) Continuation of application No. 14/062,033, filed on Oct. 24, 2013, now Pat. No. 10,395,318.

(51) Int. Cl.
*G06Q 40/08* (2012.01)

(52) U.S. Cl.
CPC .................... *G06Q 40/08* (2013.01)

(58) Field of Classification Search
CPC ................................................. G06Q 40/08
USPC .................................................... 705/4
See application file for complete search history.

(56) References Cited

U.S. PATENT DOCUMENTS

| | | |
|---|---|---|
| 8,044,794 B2 | 10/2011 | Chauncey et al. |
| 8,060,150 B2 | 11/2011 | Mendenhall et al. |
| 8,295,890 B2 | 10/2012 | Mendenhall et al. |
| 8,336,664 B2 | 12/2012 | Wallace et al. |
| 8,428,973 B1 | 4/2013 | Hopkins, III |
| 2002/0128000 A1 | 9/2002 | do Nascimento, Jr. |
| 2009/0275281 A1 | 11/2009 | Rosen |
| 2010/0033312 A1 | 2/2010 | Chauncey et al. |
| 2010/0131304 A1 | 5/2010 | Collopy et al. |
| 2010/0197351 A1* | 8/2010 | Ewell, Jr. ............. H04M 1/66 455/565 |
| 2010/0210254 A1 | 8/2010 | Kelly et al. |
| 2011/0009107 A1 | 1/2011 | Guba et al. |
| 2011/0092159 A1 | 4/2011 | Park et al. |
| 2011/0183601 A1 | 7/2011 | Hannon |
| 2011/0237219 A1 | 9/2011 | Mendenhall et al. |

(Continued)

OTHER PUBLICATIONS

Altimari, Daniela; Texting, Phoning When Driving—Even When Stopped—To Cost More; The Hartford Courant; Hartford, Connecticut; Jul. 18, 2013; 2 pages.

(Continued)

*Primary Examiner* — Hao Fu
(74) *Attorney, Agent, or Firm* — Howard IP Law Group, PC

(57) ABSTRACT

A system and method for processing and administering insurance policy premium discounts for mobile device disabling technology to promote safer driver is disclosed. An insurance policy premium discount is determined based on the level of disabling technology implemented by a user on a user's mobile device.

16 Claims, 7 Drawing Sheets

(56) References Cited

U.S. PATENT DOCUMENTS

| | | |
|---|---|---|
| 2012/0006610 A1 | 1/2012 | Wallace et al. |
| 2012/0015625 A1 | 1/2012 | Mendenhall et al. |
| 2012/0040650 A1 | 2/2012 | Rosen |
| 2012/0109692 A1* | 5/2012 | Collins .................. G06Q 30/00 705/4 |
| 2012/0244883 A1 | 9/2012 | Tibbitts et al. |
| 2013/0084847 A1 | 4/2013 | Tibbitts et al. |
| 2014/0009275 A1 | 1/2014 | Bowers et al. |
| 2015/0099500 A1* | 4/2015 | Chalmers .............. H04W 4/027 455/418 |

OTHER PUBLICATIONS

Rafael Accorsi; A secure log architecture to support remote auditing; Elsevier, accepted on Jun. 27, 2012.

* cited by examiner

| Disabling Technology | Category | Discount | Premium |
|---|---|---|---|
| Text to speech | D_2 | 1% | $XXXXX.YY |
| Autoreply to texts and emails | D_1 | 2% | $XXXXX.Y |
| Texting and email disabled above certain MPH | C_1 | 3% | $XXXX.YY |
| All text and emails blocked once inside car | B_1 | 4% | $XXXX.YY |
| Complete phone disabling within car | A_1 | 5% | $XXX.YY |

FIG. 6

SYSTEM AND METHOD FOR MOBILE DEVICE DISABLING AND VERIFICATION

CROSS-REFERENCE TO RELATED APPLICATIONS

The present application is a continuation application of U.S. patent application Ser. No. 14/062,033 filed Oct. 24, 2013, entitled "SYSTEM AND METHOD FOR ADMINISTERING INSURANCE DISCOUNTS FOR MOBILE DEVICE DISABLING TECHNOLOGY," the contents of which are incorporated herein by reference in their entirety for all purposes.

BACKGROUND

Distracted driving or more specifically, using a mobile device for electronic mail, texting, surfing the internet or other uses has become the leading cause of accidents in modern society. Generally, the youngest and most inexperienced drivers are most at risk, with 16% of all distracted driving crashes involving drivers under 20 years of age. At any given moment during daylight hours, over 800,000 vehicles are being driven by someone using a hand-held mobile device. Texting is the most alarming distraction because it involves manual, visual, and cognitive distraction simultaneously while driving. Sending or reading a text takes the driver's eyes off the road for several seconds, enough to cause a serious accident. Even hands free type systems are not effective as research indicates that the cognitive distraction of having a hands-free phone conversation causes drivers to miss the important visual and audio cues that would ordinarily help one avoid a crash.

Accidents related to distracted driving due to mobile device usage have been attributed to billions of dollars of damage in the United States. In fact, distracted driving has replaced alcohol as the number one safety concern of the driving public. In fact, distracted driving is the primary killer of American teens now. Commercial transportation companies, including marine transportation providers, are also facing unprecedented liability due to distracted driving accidents. Distraction through cell phone use whether a call comes in, responding to a text or browsing the internet is putting all drivers or anyone on or near the road in danger. Many companies have also instituted distracted driving policies and guidelines. In order to eliminate unnecessary risk behind the wheel, many companies have created policies and guidelines where employees may not engage in activities that distract them from operating a company vehicle at all times, including for personal use and a non-company vehicle while traveling on or conducting company business, for example, travel between company offices or to and from the office if taking a work-related call. Such policies include prohibitions using electronic devices such as mobile or cellular telephones, laptops, handheld organizers, Global Positioning Systems ("GPS"), and tablets. Companies have made managers and employees responsible for adherence to such company policies and guidelines and have stated that failure to do so may result in disciplinary action up to and including termination.

Accordingly, what is needed are effective ways to encourage and promote safe driving for both individuals and companies and their employees and to promote driving without active use of a mobile device.

SUMMARY

The present invention in some embodiments relates to a system for providing a mobile device related discount to an insurance customer by an insurance company for an automobile insurance policy issued by the insurance company, comprising: one or more data storage devices storing a database having data related to a plurality of mobile device disabling technologies and a plurality of discount levels; and an insurance rules processor configured to: receive data from the insurance customer indicative of the insurance customer's selection of one of the plurality of mobile device disabling technologies; correlate the insurance customer's selected mobile device disabling technology to one of the plurality of discount levels; determine an insurance premium for the insurance policy based on the correlated discount level; transmit the determined premium to the insurance customer's mobile device; and periodically verify use of the selected mobile device disabling technology.

In embodiments, a computerized method for providing an automobile insurance discount to an insurance customer by an insurance company, includes: storing data in one or more data storage devices related to a plurality of insurance policies, a plurality of mobile device disabling technologies and a plurality of discount levels associated with each of the plurality of mobile device disabling technologies; receiving by a communications interface periodic customer eligibility data related to the insurance customer's use of a mobile device disabling technology; processing in one or more processors the eligibility data to determine a discount level for the insurance customer from the plurality of discount levels; and transmitting by the communications interface the discount level to a device of the insurance customer.

In embodiments, a non-transitory computer-readable medium stores instructions adapted to be executed by a computer processor to perform a method associated with a determining discounts for automobile insurance policies, said method comprising storing data related to mobile device suppression technology data and policy premium discounts; receiving eligibility data related to a mobile device suppressing technology associated with a user; assigning a discount based on the mobile device suppressing technology; determining a policy premium based on the discount assigned; and transmitting the policy premium to the user.

BRIEF DESCRIPTION OF THE DRAWINGS

A more detailed understanding may be had from the following description, given by way of example in conjunction with the accompanying drawings wherein:

FIG. 6 shows exemplary database of an illustrative embodiment of the present invention.

DETAILED DESCRIPTION

Figure 1:
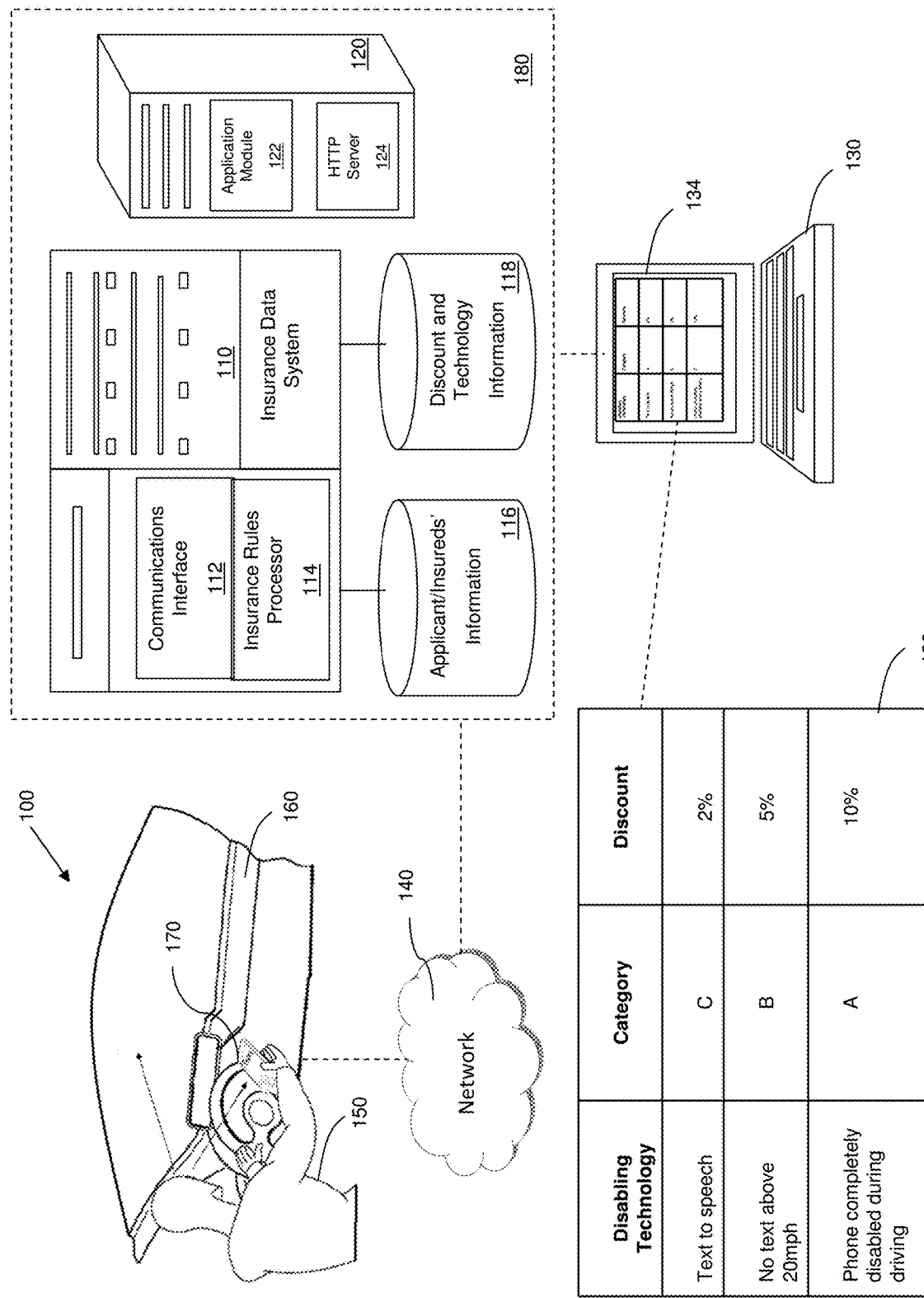
FIG. 1 shows an exemplary computer architecture that may be used for policy data administration and management.

Disclosed herein are processor-executable methods, computing systems, and related technologies for the processing and administration of insurance premium discounts based on technologies related to disabling, suppressing and/or preventing use of mobile devices during driving. Embodiments of the present invention correlate a determined effectiveness of the mobile phone disabling technology with a certain automobile insurance discount to provide a user during the term of an automobile insurance policy issued by an insurance company. Generally, the more restrictive the mobile phone disabling technology is, the larger the discount provided to the user. For example, a disabling technology that completely prohibits mobile device using during driving will be associated or correlated with the largest discount as opposed to a technology that allows a user access, albeit with one or more restrictions, to the phone during driving.

Many different technologies are available now and being developed for limiting, disabling, suppressing or prohibiting all or portions of functionality of mobile devices. Many of these technologies are software or app based in the phones and many use location based services, telematics type technology and global positioning type technology to assist with determining if an individual is driving. For example, one technology limits certain features on the phone, and then automatically sends pre-set replies to incoming texts to let people know that the user is driving. Once the app is selected by the driver, all calls, texts and emails are silenced, and the app blocks the driver from reading or typing anything. This system does offer the option to receive and make calls with up to five people, plus 911, and allows access to a certain functions such as a music playlist. To the extent that the disabling technology or suppressing technology allows access to certain phone functionality, the technology cannot be classified as being completely effective in preventing distracted driving.

Many other disabling technologies rely on text to speech type technology to read aloud text messages or emails aloud to the driver instead of completely blocking incoming messages. While helpful, these technologies still are less effective than those that completely prohibit phone use. Another technology uses GPS to determine the speed at which the car is moving and if traveling more than a certain miles per hour (mph) like 10 mph, the application will disable texting, so the driver cannot receive or respond to texts. If the user removes this application from the phone, the app notifies the owner, typically a parent, by text. The technology does let the driver unlock messages when going less than 10 mph. This type of technology can be considered to be fairly restrictive.

Another type of disabling or suppressing technology blocks texting and speaking while a vehicle is in motion and sends an automatic "Driving" or "Busy" message to anyone who texts or calls. This technology can also be customized to block text messages or calls at certain times of the day or near certain locations, such as a school or workplace. This technology may also be classified or categorized as fairly effective as the driver is not distracted by visual or auditory messages while driving.

FIG. 1 shows an example system 100 that may be used for the administration and management of automobile insurance discounts based on mobile device disabling technologies. Architecture 100 may be operated by an insurance company that includes an insurance data system 110, a web system 120, an insurance or agent terminal 130, and a network 140. System 100 also includes one or more users 150, such as an automobile policyholder or applicant for an insurance policy. User 150 operates an automobile 160 or other motor vehicle such as a motorcycle or truck or other form of transportation such as a boat or other motorized watercraft, plane or other aircraft, otherwise in conjunction with and having access to one or more mobile devices 170.

Insurance data system 110 may include a communications interface 112, an insurance rules processor 114, an applicant/insureds information database 116 and discount and technology information database 118 that may comprise an insurance company subsystem 180. In one embodiment, a terminal or computer 130, one or more users 150 and insurance company subsystem 180 are in communication via network 140. Insurance company subsystem 180 shown in FIG. 1 is an embodiment of a subsystem that might be implemented solely within the corporate office headquarters of a financial services/insurance company or be an aggregation of one or more other subsystems including one or more partner, third party administrator and/or vendor subsystems to allow communications and data transfer between the insurance company and claims representatives, adjusters, insurance customers, and insurance agents. Data transferred through network 140 to insurance subsystem 180 may pass through one or more firewalls or other security type controls implemented within web system 120. The firewall allows access to network 140 only through predetermined conditions/ports. In another embodiment, the firewall restricts the Internet IP addresses that may access web system 120.

Referring to FIG. 1 still, insurance rules processor 114 may include one or more business rules and one or more predictive models in conjunction with one or more software modules or objects and one or more specific-purpose processor elements to perform the processing required by embodiments of the present invention such as for correlating mobile device disabling technology with certain discounts and discount levels for policyholders and applicants, determining, based on applicable discounts based on correlated discount levels for mobile device disabling technology, an insurance premium, as well as for verifying and validating the mobile device disabling technology.

The applicant/insureds information database 116 may store information, data and documents that relate to insurance applications and/or insureds' policies such as automobile and/or fleet related policy information. The policies to which discounts are applicable may include personal automobile policies, business policies including vehicle policies, workers compensation policies and group benefits policies, including short term disability, long term disability, and group life insurance policies. Discount and technology information database 118 may store information, data and documents related to applicable discounts and associated mobile device disabling technology information. For example, discount and technology information database 118 may store information such as shown in table 190. Applicant/insureds' information database 116 and discount and technology information database 118 may be stored in one or more computer-readable storage media, and may be or include one or more relational databases, hierarchical databases, object-oriented databases, one or more flat files, one or more spreadsheets, and/or one or more structured files. Applicant/insureds' information database 116 and discount and technology information database 118 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communication between the insurance data system 110 and the other elements in the example system 100 of FIG. 1 may be performed via the communications interface module 112 interacting within subsystem 180. The insurance data system 110 may access and communicate with user device 170 via communications interface 112 such as to provide mobile device disabling technology validation and verification.

Referring still to FIG. 1, web system 120 may provide a web interface that may be accessed directly by a user such as an insured, a claims representative, an insurance adjuster and other third party entity utilizing computer 130 and/or device 170. In certain embodiments, computer 130 and user device 170 can include, but are not limited to cellular telephones, other wireless communication devices, personal digital assistants, pagers, laptop computers, tablet computers, smartphones, other mobile display devices, or combinations thereof. In the illustrative embodiment of present invention, computer 130 and user device 170 may communicate with the web site system 120 that may be operated by or under the control of an insurance entity or other third party entity such as an outsourced type entity or third party administrator type entity. The web site system 120 may generate one or more web pages for access by client device 170 and may receive responsive information from client device 170 such as information as to the insurance customer's selection of a mobile device disability technology and verification and validation information as to implementation of the mobile device disabling technology on user device 170. The web site system 120 may then communicate this information to the insurance data system 110 for processing via communications interface 112. The determined premium determined by insurance rules processor 114 may be transmitted to the client device 170 by providing the premium data to web site system 120, which generates one or more web pages including the premium data for display by a browser implemented on client device 170.

The web site system 120 may include a web application module 122 and a HyperText Transfer Protocol (HTTP) server module 124. The web application module 122 may generate the web pages that make up the web site and that are communicated by the HTTP server module 124. Web application module 122 may be implemented in and/or based on a technology such as Active Server Pages (ASP), PHP: Hypertext Preprocessor (PHP), Python/Zope, Ruby, any server-side scripting language, and/or any other appropriate technology.

The HTTP server module 124 may implement the HTTP protocol, and may communicate HyperText Markup Language (HTML) pages and related data from the web site to/from computer 130 and/or client device 170 using HTTP. The HTTP server module 124 may be, for example, a Sun-ONE Web Server, an Apache HTTP server, a Microsoft Internet Information Services (IIS) server, and/or may be based on any other appropriate HTTP server technology. The web site system 120 may also include one or more additional components or modules (not depicted), such as one or more switches, load balancers, firewall devices, routers, and devices that handle power backup and data redundancy.

Referring still to FIG. 1, computer 130 and/or user device 170 may include a web browser module 134, which may communicate data related to the web site to/from the HTTP server module 124 and the web application module 122 in the web site system 120. Such a web browser module may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 134 may implement Rich Internet Application (RIA) and/or multimedia technologies such as Adobe Flash, Microsoft Silverlight, and/or other technologies. The web browser module 134 may implement RIA and/or multimedia technologies using one or web browser plug-in modules (such as, for example, an Adobe Flash or Microsoft Silverlight plugin), and/or using one or more sub-modules within the web browser module 134 itself. The web browser module 134 may display data on one or more displays that are included in or connected to the client device 130, such as a liquid crystal display (LCD) display, organic light-emitting diode (OLED) display, touch screen or monitor. The client device 130 may receive input from the user of the client device 130 from input devices (not depicted) that are included in or connected to the client device 130, such a mouse or other pointing device, or a touch screen, and provide data that indicates the input to the web browser module 134.

The example architecture 100 of FIG. 1 may also include one or more wired and/or wireless networks within subsystem 180 via which communications between the elements and components shown in the example architecture 100 may take place. The networks may be private or public networks, cloud or shared networks and/or may include the Internet.

Each or any combination of the components/modules 112 and 114 shown in FIG. 1 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules 112 and 114 may perform functionality described later herein.

Figure 2:
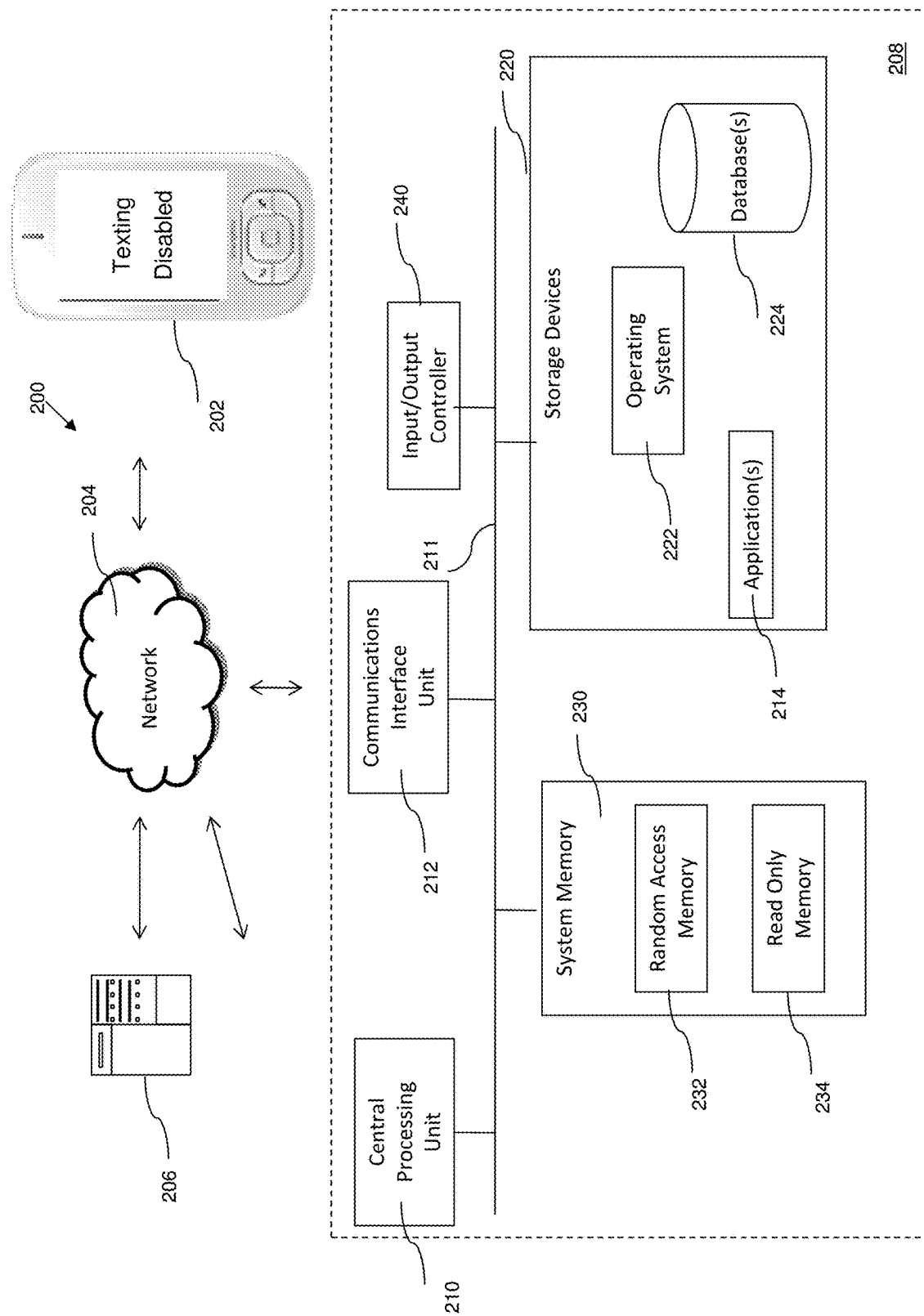
FIG. 2 shows an exemplary system that may be used for the management of policy data.

Referring to FIG. 2, an exemplary computer system 200 for use in an implementation of the invention will now be described. Computer system 200 may be configured to perform automobile insurance discount processing and management for one or more individual, business owner, fleet and/or company devices 202. System 200 may include a network 204, an insurance data system 206. In embodiments of the present invention, insurance data system 204 is responsible for the processing of insurance policies, discounts and mobile device disabling technology information. System 200 includes a computer sub-system 208 that may include a central processing unit or processor 210 that executes instructions contained in programs such as application program 214, stored in storage devices 220. Processor 210 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 220 may include suitable media, such as optical or magnetic disks, fixed disks with magnetic storage (hard drives), tapes accessed by tape drives, and other storage media. Processor 210 communicates, such as through bus 211 and/or other data channels, with communications interface unit 212, storage devices 220, system memory 230, and input/output controller 240. System memory 230 may further include non-transitory computer-readable media such as a random access memory 232 and a read only memory 234. Random access memory 232 may store instructions in the form of computer code provided by application 214 to implement embodiments of the present invention. System 200 further includes an input/output controller 240 that may communicate with processor 210 to receive data from user inputs such as pointing devices, touch screens, and audio inputs, and may provide data to outputs, such as data to video drivers for formatting on displays, and data to audio devices.

Storage devices 220 are configured to exchange data with processor 210, and may store programs containing processor-executable instructions, and values of variables for use by such programs. Processor 210 is configured to access data from data storage devices 220, which may include connecting to storage devices 220 and obtain data or read data from the storage devices, or place data into the storage devices. Storage devices 220 may include local and network accessible mass storage devices. Storage devices 220 may include media for storing operating system 222 and mass storage devices such as storage 224 for storing data related to insurance policies, discount information, mobile device disabling technology information and other related information.

Communications interface unit 212 may communicate via network 204 with other financial services/insurance company computer systems such as insurance data system 206 as well as other servers, computer systems of remote sources of data, and with systems for implementing instructions output by processor 210. Insurance data system 206 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Network 206 may be or include wired or wireless local area networks and wide area networks, and over communications between networks, including over the Internet.

One or more public cloud, private cloud, hybrid cloud and cloud-like networks may also be implemented, for example, to handle and conduct processing of one or more transactions or processing of embodiments of the present invention. Cloud based computing may be used herein to handle any one or more of the application, storage and connectivity requirements of embodiments of the present invention. For example one or more private clouds may be implemented to handle mobile device validation and verification of the present invention. Furthermore, any suitable data and communication protocols may be employed to accomplish the teachings of the present invention.

With reference still to FIG. 2, communications interface unit 212 is used for receiving user or a requesting user's mobile device disabling technology data related to the user or requesting user's policy requests made via the Web. Computer processor 210 executes program instructions, such as program instructions provided by application 214 to receive, via the communications interface 212, insurance customer selection of mobile device disabling technology data, mobile device disabling technology use verification data and other related information. Database 224 may include discount data, mobile device disabling technology data and other transaction data such as historical data from the user or other third parties.

Figure 3:
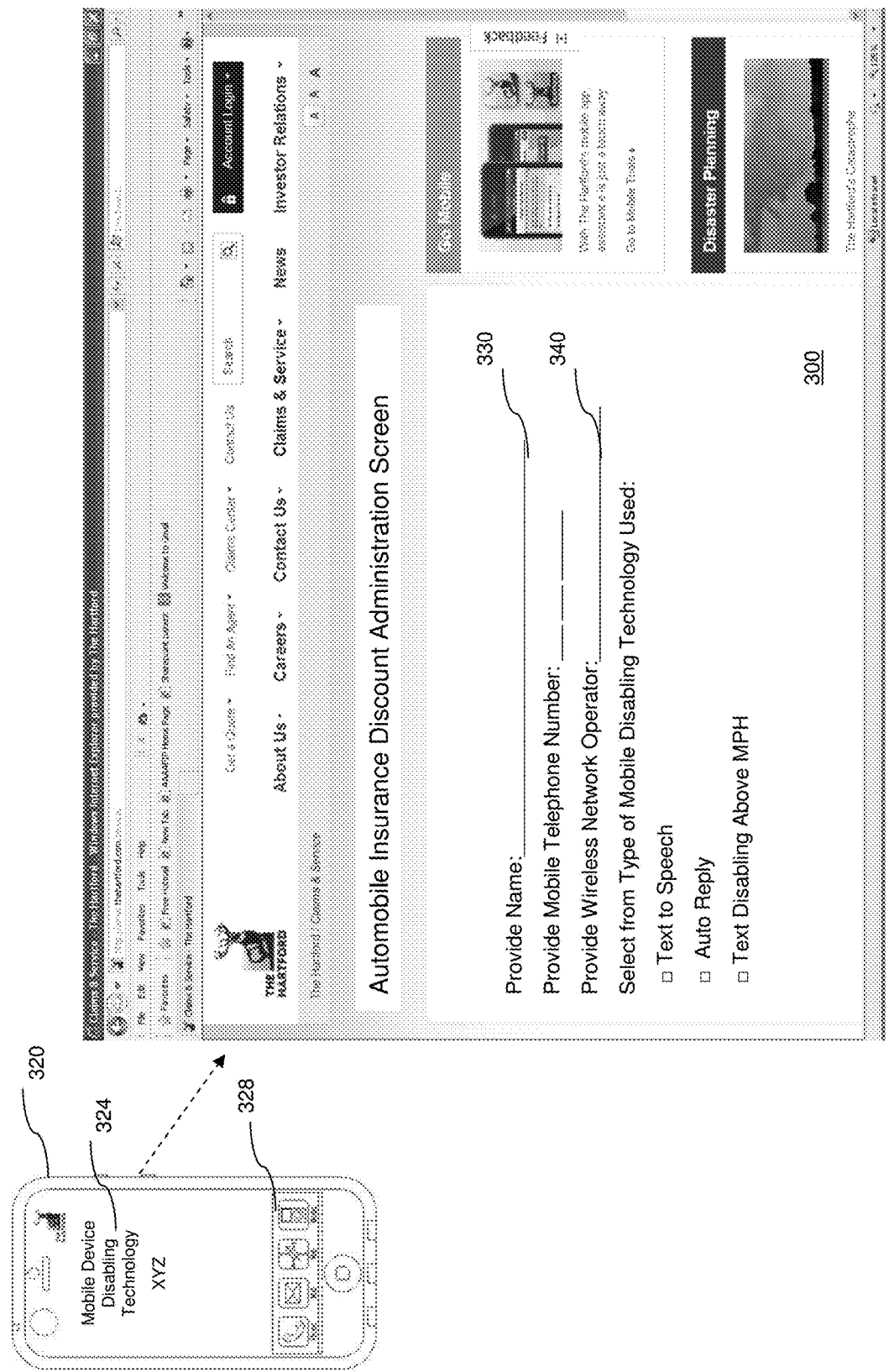
FIG. 3 shows exemplary system screen display of an illustrative embodiment of the present invention.

FIG. 3 illustrates an exemplary screen configuration 300 of an automobile discount insurance administration system as discussed with respect to FIGS. 1 and 2. Screen 300 is configured to interface with a requesting user such as an individual, small business owner or company for requesting, verifying, and receiving automobile insurance coverage and a discount based on certain mobile device disabling technology 324 implemented by the user on mobile device 320. Screen may be provided as a web page, a mobile device app or as a screen on an on board navigation screen or heads up display within an automobile. Screen 300 may be configured with one or more input/selection areas such as areas or fields 330 and 340 for collecting user specific information such as information related to the user's name, mobile device number, device type and the type of mobile device disabling technology being used. Some or all of the requested information may be inputted by the user, provided automatically from device 320 or may be provided and accessed in real time by a third party or by the insurance company using database access, web crawling techniques or other access techniques. For example, an insurance company providing screen 300 may communicate in the back end with a third party wireless service provider associated with mobile device 320 to verify installation and/or use of a mobile device disabling technology. Screen 300 may be configured to communicate in the back end with a mobile phone app provider associated with mobile device 320 to verify installation and/or use of a mobile device disabling app. Utilizing screen 300, a user may be able to control, manage and administrate various aspects of the mobile disabling technology being used such as setting various configuration aspects of the mobile device disabling technology. In other embodiments, all or portions of functionality shown in screen 300 may be provided by a mobile app provider whereby a user downloading a third party mobile device disabling app may be able to provide their insurance identifying information to the third party app provider to initiate a discount with the insurance entity. In this example, a user may be able to provide their policy number or other identifying indicia via the third party app provider page that would link to the insurance entity and initiate a discount for use of the third party mobile device disabling app. By way of example, the mobile app may be configured to provide an initial screen on the phone interface with prompts for the user to enter or select a carrier and to submit policy number or other identifying information, such as name, address, vehicle information and other information. The mobile app may then communicate the information to an insurance company system, which, responsive to receipt of the data, determining that the data corresponds to an insurance policy eligible for a discount, implements a discount at a discount level correlating to the type of technology implemented by the app.

Figure 4:
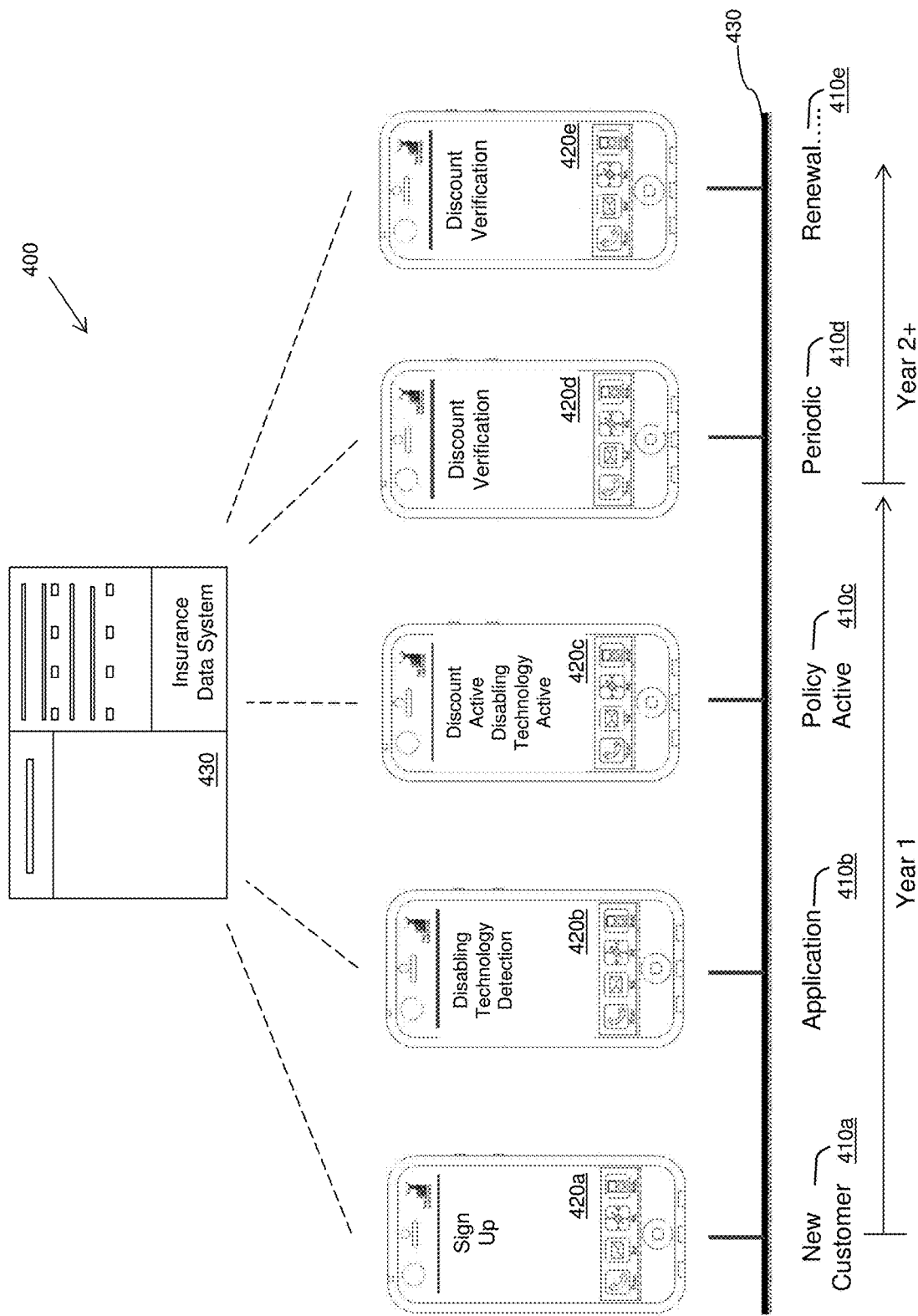
FIG. 4 shows exemplary timeline of an illustrative embodiment of the present invention.

FIG. 4 illustrates an exemplary diagrammatic process flow timeline 400 of an automobile insurance discount administration system as discussed with respect to FIGS. 1 and 2. Timeline 400 illustrates an exemplary automobile insurance discount administration timeline process from signup through renewal including a new customer phase 410*a* associated with a mobile device 420*a*, an application phase 410*b* associated with a mobile device 420*b*, an active policy phase 410c associated with a mobile device 420c, a periodic phase 410d associated with a mobile device 420d and another renewal phase 410e associated with a mobile device 420e. Mobile devices 420a-e are in communication with insurance data system 430 throughout phases 410a-e.

During new customer phase 410a mobile device 420a performs a sign up procedure for one or more insurance coverages and associated discounts. This may be either for a new customer or an existing customer. During application phase 410b mobile device 420b is used to detect and validate a mobile device disabling technology. During an active policy phase 410c mobile device 420c implements the selected mobile device disabling technology and the user or customer benefits from the associated discount correlated to that selected mobile device disabling technology. During a periodic phase 410d, mobile device 420d has to communicate with insurance data system 430 to verify that the selected mobile device disabling technology is still activated or in use or at the least that another one has been selected. During another subsequent renewal phase 410e, mobile device 420e has again to communicate with insurance data system 430 to verify that the selected mobile device disabling technology is still activated or at the least that another one has been selected. Such verifications may also initiate a communication to a policyholder, such as a parent with a child driver on the policy to notify the parent if the mobile device disabling technology is still activated or has been disabled. The communication may be real time communication, such as a text message, automated voice phone call or e-mail. The communication to a policy holder may be a communication to a supervisor or other employer representative in the case of an employee covered under a workers compensation policy, short term disability policy or long term disability policy or other employer insurance policy. In embodiments, in response to an insurance company system receiving a notification that a mobile device disabling technology has been disabled or changed to a mobile device disabling technology having a lower level of effectiveness, the discount may be discontinued, or modified to the discount level correlated to the level of effectiveness of the new mobile device disabling technology. In other embodiments, the insurance company system re-verifies or checks for receipt of a verification message within a time period, thereby providing a policyholder or policyholder representative time to reactivate or reinstall the mobile device disabling technology in accordance with the discount. If the result of the re-verification following the time period is that the mobile device disabling technology is still disabled or still modified to the mobile device disabling technology having a lower level of effectiveness, then the insurance company system will in this embodiment terminate or modify the discount. Discount termination or modification may be pro-rated based on the time period until receipt of initial notification or verification result of removal or change of the mobile device disabling technology, or the loss of discount may be retroactive to commencement of a current policy term.

Verification may be performed by insurance data system polling or pinging the mobile device or the mobile device being used to actively compose and send a communication such as an electronic mail message or text confirming that the selected mobile device disabling technology is installed. For example, an app installed on the mobile device may be configured to test periodically for installed and operating mobile device disabling technology software on the device, such as by polling configuration settings in the mobile device, checking error logs maintained by the mobile device disabling technology software, checking logs of sent and received calls, text messages, website and application, including social media application, activity, and other steps, comparing the results of the configuration settings, error logs, activity logs, and other data against one or more verification rules, and reporting the verification result. The verification result may be binary, e.g., operating or not operating, or may indicate a confidence level of the result. The verification rules may include checking for evidence of data tampering, such as empty text message logs; evidence of data tampering may be included in a message to the insurance data system. The verification schedule may be periodic or aperiodic; aperiodic verification may provide a higher confidence level that the activity data has not been tampered with. The mobile device may be configured to store GPS data, which may be analyzed, based on rate of change of location, to identify periods of possible driving activity. Additionally, insurance data system 430 may communicate with a third party service provider, such as a wireless service provider associated with the mobile device to verify installation and/or use of the mobile device disabling technology. The insurance data system may, responsive to determining that the technology is no longer in use, update policy records to indicate that the discount is no longer applicable. Insurance computer systems may calculate amounts owed as a result of a loss of the discount and bill the insurance consumer/policyholder/insured in the amount owed.

Figure 5:
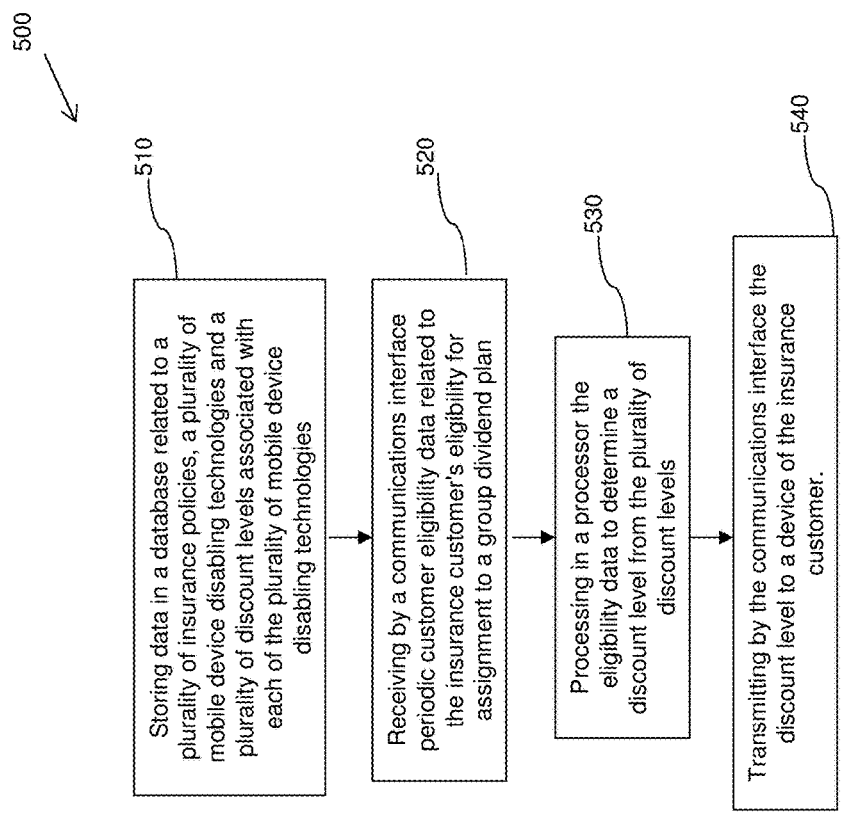
FIG. 5 shows exemplary process of an illustrative embodiment of the present invention.

FIG. 5 illustrates a method 500 for administering automobile insurance discounts that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by one or more processors result in performance according to any of the embodiments described herein.

At 510, data is stored in a database related to a plurality of insurance policies, a plurality of mobile device disabling technologies and a plurality of discount levels associated with each of the plurality of mobile device disabling technologies. Stored data may be in the form of data table 190 shown in FIG. 1 that may include fields such as disabling technology, category and discount. Each of the fields may be correlated and associated in a manner as prescribed by the insurance company so that certain disabling technologies are associated with and correlated to certain categories and certain discounts and discount levels.

At 520, periodic eligibility data is received by a communications interface related to the insurance customer's eligibility for a mobile device disabling technology related premium discount. Eligibility data may be in the form of information associated with a mobile device disabling technology such as provided by a device 320 shown in FIG. 3. Eligibility data may be in the form of a user selection of a mobile device disabling technology, such as through the user interface shown in FIG. 3. Eligibility data may be received at inception of a policy or at a later date such as renewal or other time that a user or policyholder may install and use such a mobile device disabling technology on their mobile device while driving. Eligibility data may be received on a periodic basis, such as every month, every 3 months, every 6 months, or other period.

At 530, the eligibility data is processed in a processor to determine a discount level from the plurality of discount levels. The eligibility data such as an identification of the mobile device disabling technology selected may be compared to a database of mobile device disabling technology, their relative weighting or effectiveness and correlated to a certain discount. In one embodiment, the most restrictive mobile device disabling technologies such as those that completely disable any use of a mobile device while driving are according a category rating that corresponds to the largest discount available, such as a 10% discount in a range of 1-10% of available discounts. The discount of 1-10%, or other range, may be off a premium for a policy term, such as 6 months or a year. The discount may be applied to an entire premium, or to one or more components of a premium. The discount may be calculated before other discounts are calculated, or after other discounts have been calculated. Comparatively, the discount associated with a minimally restrictive mobile device disabling technology, such as a technology that allows use of the phone and simply converts text to speech may be according a 2% discount. Other ranges of discounts are contemplated such as a range of 0-20 percent and a variety of mobile device disabling technologies may be associated with various specific discounts depending on the effectiveness or restrictiveness of the mobile device disabling technology. A text blocking technology, with no blocking of voice or social media, may be provided an intermediate discount. Technology to determine whether the mobile device is in a car may also be correlated with lower or higher discounts. For example, GPS based blocking technology may have a higher discount level than accelerometer based blocking technology. In embodiments, a same mobile device disabling technology having user-selectable settings will be considered as multiple technologies of differing effectiveness, depending on the user-selected setting.

At 540, the discount level determined is transmitted by the communications interface to a device of the insurance customer. For example, as shown in FIG. 1, insurance data system 110 may transmit to the mobile device 170 the determined discount shown in table 190. It is contemplated that the discount level may change during the lifetime of an insurance policy as during renewal time or other period where the mobile device disabling technology selected may be changed or removed. For example, if the user changes to a more restrictive or effective mobile device disabling technology then the discount may increase and conversely if the user changes to a less restrictive or effective mobile device disabling technology, the discount may decrease. Responsive to receiving data indicative of technology removal, the system may remove the discount, terminate the discount for an entire policy term or on a prorated basis for a remainder of a policy term, or terminate the discount at a next renewal. The insurance system may be configured to request additional eligibility data at a renewal for the insurance policy. The additional data may include technology log data indicating whether the technology has been active at all times, software version data, third party carrier data verifying that the insurance customer does not have additional mobile device service not subject to the technology, and other data. The user's actual use of the mobile device disabling technology may also affect the discount provided and if it is determined that the mobile device disabling technology is installed but not in use, the discount may be reduced or eliminated. For example, as shown in FIG. 4, during a periodic phase 410d, the installation and/or use of the mobile device disabling technology may be verified. The discount may be eliminated for an entire policy term, or the discount may be prorated.

Referring to FIG. 6, a table is shown that represents an automobile discount insurance database 600 that may be stored, for example, within database 118 shown in FIG. 1 or database 224 shown in FIG. 2 Database 600 may include, for example, entries identifying certain data and information related to administering and managing automobile discounts for certain mobile device disabling technologies. For example, database may also define fields 610, 620, 630 and 640 for each of the entries. The fields 610, 620, 630 and 640 may, according to some embodiments, specify: mobile device disabling technologies 610, rating categories 620, discounts levels 630 and premium pricing information 640. The automobile discount insurance database 600 may be created and updated on a periodic basis or in real time as information related to the fields of mobile device disabling technologies 610, rating categories 620, discounts levels 630 and premium pricing information 640 change such as when new mobile device disabling technologies are available.

Referring still to FIG. 6, the rating categories 620 may be, for example, insurance company-specific alphanumeric codes identifying a particular rating or indicia that correspond to a determined or a perceived effectiveness of the corresponding mobile device disabling technology 610. In embodiments, the effectiveness rating categories may be industry-standard, maintained by third parties, or other embodiments other than insurance company-specific. Technologies may be assigned to effectiveness categories manually or automatically using algorithms relating technology features to effectiveness categories. Premium pricing 640 may be dependent on such a rating category 620 and the associated discount 630. The discount is greater for greater effectiveness ratings. For example, in the illustration of FIG. 6, an insurance premium 650 is calculated or determined by multiplying discount 660 with a calculated total yearly premium for the user.

Premium discounts may depend on a variety of other factors in addition to the type and effectiveness of the mobile device disabling technology. For example, the premium discount may depend on driver age, with the discount being greater for age ranges having a greater likelihood of texting, such as 19 and under, 20-29, and lesser discounts for greater ages. Discount may be affected by the rating of the type of user that has implemented the mobile device disabling technology. For example, a so-called higher risk driver that is using a mobile device disabling technology would be granted a relatively greater discount than a lower risk driver that implemented the mobile device disabling technology.

Premium discounts may depend on other factors indicative of likelihood of driver use of mobile devices while driving. For example, premium discounts may vary by gender, commuter use (as reflected in insurance policy data) vs. pleasure use, educational level of drivers, and other data. In embodiments, the insurance company data may include time of day and day of week data when a driver is driving; data as to frequency of texting during particular times of day may be correlated and greater discounts provided to drivers who drive more during periods of greater texting or other mobile device use. In embodiments, discounts may be greater based on such factors as levels of risk associated with times of day and days of week driving, areas and roads in which a vehicle is driven and weather conditions while driving. By way of example, a driver who drives at higher risk times of day and days of week, or on higher risk roads or in higher risk areas, may qualify for a greater percentage discount than a driver with corresponding lower risk driving habits. Discounts may also vary based on the duration the mobile device disabling technology is active during a specific trip. For example, the largest applicable discount is applied when the mobile device disabling technology is active for the entire trip duration whereby only a half the largest applicable discount is applied when the mobile device disabling technology is active for only half of the trip.

In embodiments, as disclosed for example, in commonly assigned application Ser. No. 12/641,025, a mobile device may be configured with an application and connected to an onboard diagnostics port connector or other connector to a vehicle computer system for exchange of data and instructions and other purposes, and the application may further be configured to disable one or more user communications capabilities upon detection of a connection to a vehicle computer system, or responsive to receipt of data indicative of vehicle motion, a vehicle being in a gear other than park, or other parameters, detected via an onboard connector. In embodiments, the discount may be eligible only subject to mobile device connection to the vehicle computer system, and full or partial disabling of capabilities of the mobile device as described herein.

In embodiments, one or more other policy terms may be altered in addition to or as a substitute for premium discounts. For example, for use of mobile device disabling technologies, deductibles may be reduced or eliminated, accidents and/or speeding or other traffic violations may be forgiven without premium increases, additional coverages or features may be provided without premium increase, policy term may be extended, coverage limits may be increased, and other modifications and adjustments may be made to one or more insurance policy terms.

Figure 7:
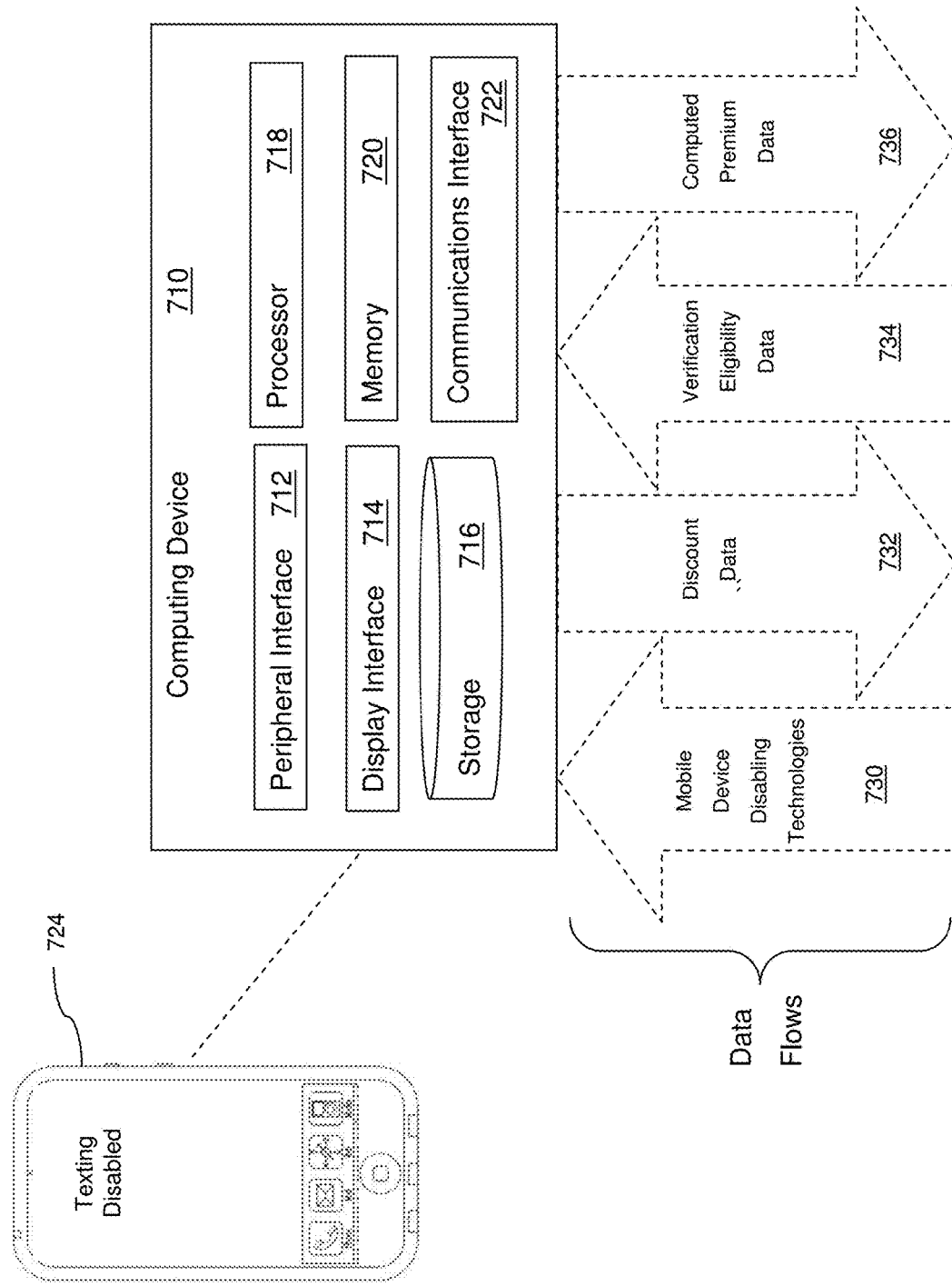
FIG. 7 shows another exemplary device of an illustrative embodiment of the present invention.

FIG. 7 shows an example computing device 710 that may be used to implement features describe above for processing, selecting and displaying business product and coverage recommendations in accordance with embodiments of the present invention. The computing device 710 may include a peripheral device interface 712, display device interface 714, a storage device 716, a processor 718, a memory device 720, and a communication interface 722. Computing device 710 may be coupled to a mobile display device 724, which may be separately coupled to or included within the computing device 710. In operation, computing device 710 is configured to receive and transmit a number of data flows via communications interface 722 including, for example, mobile device disabling technologies related data 730, discount data 732, verification eligibility data 734 and computed premium data 736. In one embodiment, the computing device 710 and the mobile display device 724 are an integrated device such as a mobile device or an automobile based device such as an on board navigation/telematics type system In other embodiments, the computing device 710 and the mobile display device 724 are separate devices that communicate with one another via Bluetooth or otherwise. In such embodiments, the mobile device disabling technology may be functionally integrated between both devices. For example, the mobile device may be linked to the automobile's on board systems to help implement the mobile device disabling technology.

The peripheral device interface 712 may be an interface configured to communicate with one or more peripheral devices. The peripheral device interface 712 may operate using a technology such as Universal Serial Bus (USB), PS/2, Bluetooth, infrared, serial port, parallel port, and/or other appropriate technology. The peripheral device interface 712 may, for example, receive input data from an input device such as a keyboard, a mouse, a trackball, a touch screen, a touch pad, a stylus pad, and/or other device. Alternatively or additionally, the peripheral device interface 712 may communicate output data to a printer that is attached to the computing device 710 via the peripheral device interface 712.

The display device interface 714 may be an interface configured to communicate data to mobile display device 724. The mobile display device 724 may be, for example, a smartphone, a tablet computer, a handheld computer, monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 714 may operate using technology such as Video Graphics Array (VGA), Super VGA (S-VGA), Digital Visual Interface (DVI), High-Definition Multimedia Interface (HDMI), or other appropriate technology. The display device interface 714 may communicate display data from the processor 718 to the mobile display device 724 for display by the display device 724. As shown in FIG. 7, the display device 724 may be external to the computing device 710, and coupled to the computing device 710 via the display device interface 714. Alternatively, the display device 724 may be included in the computing device 710.

The memory device 720 of FIG. 7 may be or include a device such as a Dynamic Random Access Memory (D-RAM), Static RAM (S-RAM), or other RAM or a flash memory. The storage device 716 may be or include a hard disk, a magneto-optical medium, an optical medium such as a CD-ROM, a digital versatile disk (DVDs), or Blu-Ray disc (BD), or other type of device for electronic data storage.

The communication interface 722 may be, for example, a communications port, a wired transceiver, a wireless transceiver, and/or a network card. The communication interface 722 may be capable of communicating using technologies such as Ethernet, fiber optics, microwave, xDSL (Digital Subscriber Line), Wireless Local Area Network (WLAN) technology, wireless cellular technology, and/or any other appropriate technology.

An instance of the computing device 710 of FIG. 7 may be configured to perform any feature or any combination of features described above as performed by user devices 130 and 170 as described with respect to FIG. 1. In such an instance, the memory device 720 and/or the storage device 716 may store instructions which, when executed by the processor 718, cause the processor 718 to perform any feature or any combination of features described above as performed by the web browser module 134. Alternatively or additionally, in such an instance, each or any of the features described above as performed by the web browser module 134 may be performed by the processor 718 in conjunction with peripheral device interface 712, display device interface 714, and/or storage device 716, memory device 720, and communication interface 722.

Alternatively or additionally, an instance of the computing device 710 may be configured to perform any feature or any combination of features described above as performed by the insurance data system 110. In such an instance, the memory device 720 and/or the storage device 716 may store instructions which, when executed by the processor 718, cause the processor 718 to perform any feature or any combination of features described above as performed by the interface module 112 and/or the insurance rules module 114. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the web site system 120. In such an instance, the memory device 720 and/or the storage device 716 may store instructions which, when executed by the processor 718, cause the processor 718 to perform any feature or any combination of features described above as performed by the web application module 122 and/or the HTTP server module 124. In such an instance, the processor 718 may perform the feature or combination of features in conjunction with the memory device 720, communication interface 722, peripheral device interface 712, display device interface 714, and/or storage device 716.

Although FIG. 7 shows that the computing device 710 includes a single processor 718, single memory device 720, single communication interface 722, single peripheral device interface 712, single display device interface 714, and single storage device 716, the computing device may include multiples of each or any combination of these components 712, 714, 716, 718, 720, and 722 and may be configured to perform analogous functionality to that described above.

Although the methods and features described above with reference to FIGS. 1-7 are described above as performed using the example architecture 100 of FIG. 1 and the exemplary system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-7 may be used alone without the other features and elements or in various combinations with or without other features and elements. Sub-elements of the methods and features described above with reference to FIGS. 1-7 may be performed in any arbitrary order (including concurrently), in any combination or sub-combination.

What is claimed is:

1. A system for providing for implementation and verification of use of a mobile device disabling technology in a vehicle, comprising:
    a mobile device, wherein the mobile device is configured to:
        execute instructions of an installed mobile device disabling application, the mobile device disabling application: (a) causing the mobile device to communicate with a vehicle computer system; and (b) disabling one or more communications capabilities of the mobile device; and
        execute instructions of an installed verification application, the installed verification application: (a) causing the mobile device to compare, to verification rules, results of checking for one or more empty logs, including at least an empty text message log, on the mobile device, to verify absence of tampering; and (b) causing the mobile device to transmit results of the verification, the transmitted results of the verification, responsive to determining that the text message log is empty, constituting an indication of tampering;
    a central computer system, in communication with the mobile device, comprising:
        one or more data storage devices storing data indicative of: remote users; a selected mobile device disabling technology associated with each of remote users and third parties; a plurality of mobile device disabling technologies; a plurality of discount levels; and correlations between each of the mobile device disabling technologies and the plurality of discount levels; and
        a rules processor configured to:
        initiate a communication to a third party system having data indicative of whether one or more of the mobile device disabling technologies is activated or has been disabled;
        correlate a remote user's selected mobile device disabling technology to one of the plurality of discount levels;
        determine a premium for a risk coverage policy based on the correlated discount level;
        transmit the determined premium to the remote user;
        receive a result of the verification from the mobile device;
        based on the result of the verification, maintain the determined premium, or modify the determined premium by discontinuing the determined premium or applying a different one of the plurality of discount levels; and
        transmit, by a communications interface to the mobile device, data indicative of a modified discount level.

2. The system of claim 1, wherein the plurality of mobile device disabling technologies comprises at least two of: (a) a first mobile device disabling technology that completely disables any use of a mobile device while driving; (b) a second mobile device disabling technology that allows use of a mobile device and converts text to speech while driving; (c) a third mobile device disabling technology that blocks text communications while driving with no blocking of voice or social media; (d) a fourth mobile device disabling technology that automatically sends pre-set replies to incoming text messages, silences all calls, text messages and emails, and blocks a driver from reading or typing; (e) a fifth mobile device disabling technology that disables texting when the vehicle is moving faster than a pre-determined speed; and (f) a sixth mobile device disabling technology that blocks text messages and calls based on at least one of time-of-day and location;
    wherein each of the plurality of mobile device disabling technologies correlates to a discount level, wherein at least two of the plurality of mobile device disabling technologies have different discount levels from one another.

3. The system of claim 1, wherein the correlations between each of the mobile device disabling technologies and the plurality of discount levels, comprises: (a) a first mobile device disabling technology that completely disables any use of the mobile device while driving corresponds to a first discount level; (b) a second mobile device disabling technology that allows use of the mobile device and converts text to speech while driving corresponds to a second discount level representing a lesser discount than the first discount level; and (c) a third mobile device disabling technology that blocks text communications while driving with no blocking of voice or social media, corresponds to a third discount level representing a discount between the first discount level and the second discount level.

4. The system of claim 1, wherein the installed verification application further causes the mobile device to compare, to verification rules, results of: checking configuration settings of the mobile device; and checking logs of sent and received calls, text messages, website activity and application activity of the mobile device to check that the mobile device disabling application is installed and operating on the mobile device to verify absence of tampering.

5. The system of claim 1, wherein the installed verification application further causes the mobile device to compare, to verification rules, results of a check of whether the mobile device disabling application has been removed from the mobile device to verify absence of tampering;
wherein, responsive to a determination that the mobile device disabling application has been removed from the mobile device, the installed verification application causes the mobile device to transmit a communication to a policy holder notifying the policy holder of the removal.

6. The system of claim 1, wherein the installed verification application on the mobile device further causes the mobile device to periodically or aperiodically verify use of the selected mobile device disabling technology.

7. The system of claim 1, wherein the rules processor is further configured to periodically or aperiodically poll the mobile device to verify use of the selected mobile device disabling technology and to cause the mobile device to transmit results of the verification to the central computer system.

8. The system of claim 1, wherein the rules processor is further configured to verify use of the selected mobile device disabling technology by periodically or aperiodically initiating a communication to the third party system having the data indicative of whether the mobile device disabling application is activated or has been disabled and to cause the mobile device to transmit results of the verification to the central computer system.

9. A computerized method for providing for implementation of mobile device disabling technology in a vehicle, the method comprising:
by a mobile device, executing instructions of an application program for disabling the mobile device, communicating with a vehicle computer system and disabling one or more communications capabilities of the mobile device;
by the mobile device, executing instructions of an installed verification application, verifying absence of tampering at least by checking for one or more empty logs, including at least an empty text message log, on the mobile device; and transmitting to a communications interface results of the verification, the transmitted results of the verification, responsive to determining that the text message log is empty, comprising an indication that the empty text message log has been identified;
receiving by one or more processors of a computer server, via the communications interface, mobile device disabling technology usage verification data from the mobile device; and
initiating by the one or more processors, a communication, via a communications interface, to a third party system, having data indicative of whether the application program for disabling the mobile device is activated or has been disabled;
storing data in one or more data storage devices related to a plurality of risk coverage policies, a plurality of mobile device disabling technologies and a plurality of discount levels correlated with each of the plurality of mobile device disabling technologies;
correlating, by the one or more processors, a remote user's selected mobile device disabling technology to one of the plurality of discount levels;
determining, by the one or more processors, a premium for a risk coverage policy based on the correlated discount level;
transmitting, by the one or more processors, the determined premium to the remote user;
receiving, by the one or more processors, a result of the verification from the mobile device;
based on the verification, maintaining by the one or more processors the correlated discount level, or modifying by the one or more processors the correlated discount level by discontinuing the discount or applying a different one of the plurality of discount levels; and
transmitting, by the communications interface to the mobile device, data indicative of a modified discount level.

10. The computerized method of claim 9, wherein the plurality of mobile device disabling technologies comprises at least two of: (a) a first mobile device disabling technology that completely disables any use of a mobile device while driving; (b) a second mobile device disabling technology that allows use of a mobile device and converts text to speech while driving; (c) a third mobile device disabling technology that blocks text communications while driving with no blocking of voice or social media; (d) a fourth mobile device disabling technology that automatically sends pre-set replies to incoming text messages, silences all calls, text messages and emails, and blocks a driver from reading or typing; (e) a fifth mobile device disabling technology that disables texting when the vehicle is moving faster than a pre-determined speed; and (f) a sixth mobile device disabling technology that blocks text messages and calls based on at least one of time-of-day and location;
wherein each of the plurality of mobile device disabling technologies correlates to a discount level, wherein at least two of the plurality of mobile device disabling technologies have different discount levels from one another.

11. The computerized method of claim 9, wherein executing instructions of the application program by the mobile device for disabling the mobile device comprises disabling one or more communications capabilities of the mobile device responsive to receiving, from the vehicle computer system, data indicative of the vehicle being in a gear other than park.

12. The computerized method of claim 9, wherein executing instructions of the installed verification application by the mobile device further comprises comparing, to verification rules, results of: checking configuration settings of the mobile device; and checking logs of sent and received calls, text messages, and website and application activity of the mobile device to check that the application program for disabling the mobile device is installed and operating on the mobile device to verify absence of tampering.

13. The computerized method of claim 9, wherein executing instructions of the installed verification application further comprises comparing, to verification rules, results of a check of whether the mobile device disabling application has been removed from the mobile device to verify absence of tampering; and, responsive to a determination that the mobile device disabling application has been removed from the mobile device, transmitting by the mobile device, a communication to a policy holder notifying the policy holder of the removal.

14. The computerized method of claim 9, further comprising periodically or aperiodically polling, by the one or more processors, the mobile device to verify use of the selected mobile device disabling technology and transmitting, by the mobile device, results of the verification to the one or more computer processors.

15. The computerized method of claim 9, further comprising verifying, by the one or more processors, continuing use of the selected mobile device disabling technology by periodically or aperidocially initiating a communication to the third party system having data indicative of whether the mobile device disabling application is activated or has been disabled and transmitting, by the mobile device, results of the verification to the one or more computer processors.

16. The computerized method of claim 9, further comprising computing, by the one or more processors, a discount level based on a duration the mobile device disabling technology is active on a trip.

\* \* \* \* \*